Sept. 17, 1929.    A. DINA    1,728,670
FILM PRESSER PAD AND MOUNTING THEREFOR
Filed Sept. 20, 1927
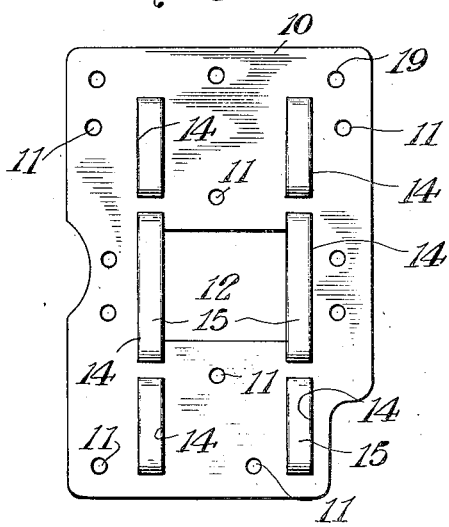
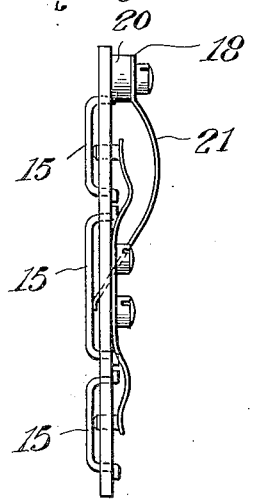
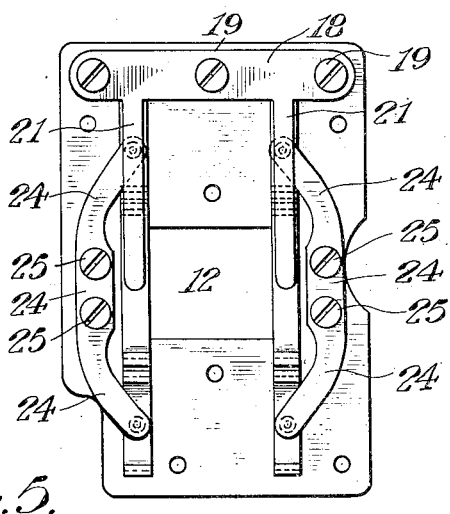
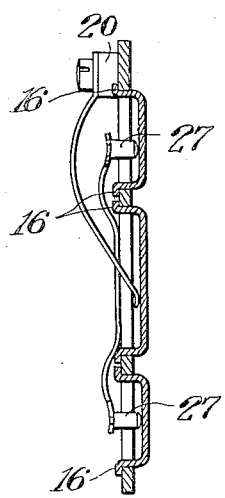
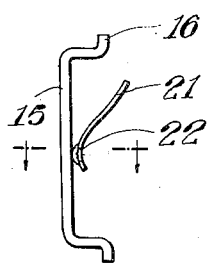
Inventor
Augusto Dina
By his Attorney
Howard W. Dix Patented Sept. 17, 1929

1,728,670

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

FILM PRESSER PAD AND MOUNTING THEREFOR

Application filed September 20, 1927. Serial No. 220,690.

The present invention relates to moving picture machines and more particularly to an improved device or pressure pad for applying tension to the film adjacent the aperture plate in such machines.

The importance of properly tensioning the film being projected cannot be overestimated. If insufficient pressure is applied the projected pictures are noticeably unsteady; on the other hand, if too much pressure is applied the wear on the film at the sprocket holes and on the parts of the machine is multiplied. This is due to the fact that parts which are capable of intermittently moving the film through the necessary number of definite positions per second must be very delicate. Hence an overload on these parts, if not sufficient to break them, will cause excessive wear. The teeth in the sprockets tend to damage the holes in the film and the strains upon the intermittent mechanism are greatly increased.

Heretofore it has been customary to apply pressure to the film by means of runners, some three inches in length, on the respective sides of the film. Flanged extensions, integral with the runners at their center, fit against the sides of the window or opening for the projecting light in a supporting plate. Suitable springs engage the extensions to hold them in position. In this way pressure is applied only at the center at a substantial distance from the film engaging surface of the runner. The movement of the film across the bottom of the runners tends to rotate them about their centers. Hence, the pressure applied to the film is far from uniform. The friction forces unbalance the mechanism and a greater pressure is applied to the upper part of the film than to the lower part. In fact, there is a tendency to gripe at the upper ends. In addition to excessive wear on both film and intermittent mechanism such runners have a tendency to cause unsteady projection. Frequent adjustments are necessary and have to be made by operators not thoroughly familiar with the delicate mechanism and not materially interested in prolonging the life of the machine or the film. Damaged machines or films frequently result.

The present invention eliminates the difficulties noted above by providing a series of independent pads or shoes adapted to apply pressure to the respective sides of the portion of film being projected. The pads are relatively short in length and pressure is preferably applied to them independently. Preferably the upper and lower pair of pads apply substantially greater pressure to the film whereby the portion of film being projected between these pairs of pads is always properly tensioned. The pair of pads at the center which preferably are of the same length as the length of the window apply sufficient pressure to hold the film in a definite position over the aperture. The pads are held in position by pressure applied to the center thereof substantially at the face of the pad. In this way the friction between the pad and the film has a minimum leverage for rotation of the pad. Hence, the pads will always be pressed flat against the film and this is further facilitated by the short length of these members. Leaf springs with definite resiliency, eliminate the necessity for adjustments. The individual action of the respective pads assures a definite pressure at all points of engagement with the film.

An object of the present invention is to apply a substantially uniform definite pressure at the points preceding and following the portion of the film being projected.

Another object of the invention is to apply pressure at a plurality of points along the side of the film by means of independent pressure applying elements.

Another object of the invention is to minimize the tension in the film and to improve the operation of projecting machines by providing means for applying a substantially uniform tension to the moving film.

Another object of the invention is to provide an inexpensive tension shoe plate which may be readily manufactured and applied to existing machines.

Other and further objects of the invention will be obvious upon an understanding of the illustrated embodiment about to be described, and various advantages not referred to herein will occur to one skilled in the art upon employment of the invention in practice.

A preferred embodiment of the invention has been chosen for purposes of illustration and description and is shown in the accompanying drawings, wherein Fig. 1 is a front elevational view of one side of the plate with the tension pads in position;

Fig. 2 is an elevational view of the other side of the plate showing the springs holding the presser pads in place;

Fig. 3 is a side elevational view of the plate;

Fig. 4 is a sectional view illustrating details of construction;

Fig. 5 is a detailed view illustrating the transmission of pressure from the spring to a pad; and Fig. 6 is a sectional view along the line 6—6 of Fig. 5.

Referring to the drawings, there is shown a plate 10 preferably of hard metal having apertures 11, here shown as six in number, to permit the plate to be rigidly secured and preferably spaced from a support by means of screws. The six-point support minimizes any tendency of the plate to flex and definitely holds it in proper position. At the center of the plate is a light projecting opening or window 12 which is adapted to be aligned with the aperture in a suitable aperture plate so that the light may be projected through a film passing between the two.

At each side of the window 12 is a series of elongated apertures or slots 14 preferably three on each side. In each of these apertures is a pad 15, the ends of which are preferably bent upwardly and outwardly as shown at 16 to fit over the end of the slots, the extreme ends being substantially parallel with the bottom part of the pad.

The center pads are held in position by leaf spring 18 secured at the upper end of the plate by means of the screws 19 and spaced from the plate by means of the elongated washer 20. A pair of spring members 21 project from the leaf spring 18 and have their project from the leaf spring 18 and have their ends rounded as shown at 22 to form substantially a point contact at the center of the pad. The pressure is applied at a point spaced from the film engaging surface of the pad merely by the thickness of the metal, to prevent the tendency of the upper end of the pad to ride up because of the frictioning forces occasioned by the moving film.

The end pads are held in position by a pair of springs 24 secured at their centers, by means of the screws 25, at substantially the center of the plate. The free ends of the springs 24 preferably have pins 27 secured thereto and rounded at their lower ends to bear upon the centers of the end pads. Again, the pressure is applied by a loose connection at substantially the film engaging surface of the pad. The same spring applies pressure to the end pads and hence apply a uniform tension on the respective sides of the film. The spring 18 in applying the pressure to the center pair of pads preferably applies a substantially less pressure than is applied to the end pads by the spring 24.

In the operation of such a device the plate may be secured to a suitable mounting by screws extending through the apertures 11 preferably on a gate such as that shown in my co-pending application, S. N. 220,689 filed September 20, 1927. It will be understood, however, that the present construction may be utilized in constructions other than that shown in the referred to application.

When the gate with such a plate is closed, the upper and lower pairs of presser pads engage the film on the respective sides of the aperture and create a uniform tension so that the film is vertically stretched across the aperture. The center pads press the film against the aperture plate and hold it definitely in lateral position in respect to the aperture plate so that a most efficient projection is obtained. The center pair of pads may and preferably do exert substantially less pressure on the film than the end pads exert. The function of the center pads is primarily to hold the film in proper lateral position and not to create tension. The end pads apply the tension and cause the film to be vertically stretched across the aperture in the aperture plate. The pressure is applied to the film only at points where needed and the amount can, therefore, be reduced to a minimum. In this manner, the force required to pull the film into its respective positions is materially decreased while the projection of the pictures is much more steady than with the tension runners used heretofore.

Since the amount of pressure is determined by the springs 18 and 24 and not by adjustments thereof, the manufacturer can definitely fix the pressure applied to the shoes by the characteristics of the springs supplied and in this way definitely determine the pressure which will give the most effective results. It is not necessary or feasible for the operator to change or tamper with the adjustment made at the factory. Further, the point of contact between the springs and shoes is substantially at the film engaging surface and the tendency of the pad to rotate and the resulting wear on the edges are minimized.

It will be seen that the present invention provides an inexpensive plate for mounting tension producing presser pads upon which the respective parts may be mounted with a minimum of time and trouble. The tension pads are relatively short and are held in such manner that the tendency for one end to ride up is minimized. The forces required to position the film are reduced materially over those required to position the film where spring pressure is applied to long runners engaging the film. Further, the device is rugged in construction, free from adjustments and fully capable of withstanding the rough usage to which it may be subjected. The device is simple of construction thereby giving low manufacturing cost. It may readily be incorporated in any projecting machine. It will also be seen that the contact of each spring with its pad is correct so that there is no tilting of the pads which tilting causes wear on one edge of the shoe.

It will be noted in general that the presser pads are designed to give maximum and efficient use with minimum wear to the film and to the operating parts. These advantages are obtained in this construction as the full surface of each pad is in full physical contact with the film so that the pressure per square inch is reduced to a minimum without impairing the efficiency of the pad.

As various changes may be made in the above embodiment without departing from the spirit of the invention, it is to be understood that all matter herein is to be taken as illustrative and not in a limiting sense.

Having thus described the invention, what is claimed is:

1. In a device of the class described, the combination of a plurality of presser pads adapted to engage the sides of the film, a pair of springs adapted to retain the end pads in position, and a second pair of springs adapted to retain the center pads in position, said first pair of springs being adapted to apply a greater pressure to said pads per unit area than said second pair of springs.

2. In a device of the class described, the combination of a plate having a plurality of apertures therein, presser pads in said apertures, and a plurality of leaf springs adapted to retain said pads in position, said springs having substantially spherical portions bent therefrom to form substantially point contacts with said pressure pads.

3. In a device of the class described, the combination of a plate having a plurality of apertures therein, tension pads in said apertures and a plurality of springs having means thereon adapted to form point contacts with said pads to retain same in position and permitting substantially universal movement.

4. In a device of the class described, the combination of a plurality of presser pads, a plurality of springs for retaining said pads in position, and members on said springs adapted to frictionally engage and to form substantially point contacts with said pads substantially at the film engaging surface of said pads.

5. In a device of the class described, the combination of a plurality of presser pads and a plurality of springs for retaining said pads in position, certain of said springs having their ends shaped to form a point contact with said pads and other of said springs having pins with rounded ends mounted thereon to form point contacts with other pads.

6. In a device of the class described, the combination of a plate having a plurality of aligned apertures along the respective sides thereof, presser pads in said apertures, leaf springs secured to said plate at their centers and pins attached to the free ends of said springs adapted to retain a pair of pads in position.

7. In a device of the class described, a plate having a plurality of aligned apertures along the respective sides thereof, presser pads in said apertures and a pair of leaf springs secured to said plate at their centers with their free ends adapted to retain the end pads in position, and a pair of leaf springs having their ends secured to said plate with their free ends bent into buttons to engage and to form substantially point contacts with the center pads.

8. In a device of the class described, the combination of an aperture plate, pressure pads adapted to engage the film at the respective ends of the aperture, pressure pads adapted to hold a film over the aperture, permanently adjusted springs for applying pressure to said first mentioned pads, and springs adapted to apply relatively low pressure to said second mentioned pads.

9. In a device of the class described, the combination of an aperture plate, pressure pads adapted to apply pressure to the portions of the film at the respective ends of the aperture to tension the film passing over the aperture, and pressure pads adapted to apply a relatively low pressure to the film adjacent the side of the aperture to hold the projected portion of the film firmly against the aperture.

AUGUSTO DINA.